(12) United States Patent
Badami

(10) Patent No.: US 9,045,999 B2
(45) Date of Patent: Jun. 2, 2015

(54) BLADE MONITORING SYSTEM

(75) Inventor: Vivek Venugopal Badami, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 1273 days.

(21) Appl. No.: 12/789,604

(22) Filed: May 28, 2010

(65) Prior Publication Data

US 2011/0293403 A1 Dec. 1, 2011

(51) Int. Cl.
*G01B 3/44* (2006.01)
*F01D 21/00* (2006.01)
*G05B 23/02* (2006.01)

(52) U.S. Cl.
CPC ............ *F01D 21/003* (2013.01); *G05B 23/021* (2013.01); *G05B 23/0221* (2013.01); *F05D 2260/80* (2013.01)

(58) Field of Classification Search
CPC . F01D 21/003; F05D 2260/80; G05B 23/021; G05B 23/0221
See application file for complete search history.

(56) References Cited

U.S. PATENT DOCUMENTS

| 5,148,711 | A | 9/1992 | Twerdochlib et al. | |
|---|---|---|---|---|
| 5,206,816 | A | 4/1993 | Hill et al. | |
| 5,481,269 | A * | 1/1996 | Imhoff et al. | 342/90 |
| 7,383,136 | B1 | 6/2008 | Griffin et al. | |
| 7,654,145 | B2 * | 2/2010 | Twerdochlib | 73/660 |
| 7,836,772 | B2 * | 11/2010 | Twerdochlib | 73/661 |
| 7,941,281 | B2 * | 5/2011 | Rai et al. | 702/34 |
| 7,987,725 | B2 * | 8/2011 | Twerdochlib | 73/661 |
| 8,478,547 | B2 * | 7/2013 | Hadley et al. | 702/34 |
| 2008/0317587 | A1 * | 12/2008 | Lord et al. | 415/160 |
| 2009/0078052 | A1 * | 3/2009 | Twerdochlib | 73/660 |
| 2009/0078053 | A1 | 3/2009 | Twerdochlib | |
| 2009/0177363 | A1 * | 7/2009 | Kulczyk et al. | 701/100 |
| 2010/0161245 | A1 * | 6/2010 | Rai et al. | 702/35 |

(Continued)

FOREIGN PATENT DOCUMENTS

JP 04019720 A * 1/1992 ................ G02F 3/00

OTHER PUBLICATIONS

Maynard, K. P., and Trethewey, M. W., "Blade and Shaft Crack detection Using Torsional Vibration Measurements Part 1: Feasibility Studies", Noise and Vibration Worldwide, vol. 31, No. 11, Dec. 2000, pp. 9-15.*

*Primary Examiner* — Elias Desta
(74) *Attorney, Agent, or Firm* — Hoffman Warnick LLC; Ernest G. Cusick

(57) ABSTRACT

In one embodiment, a blade monitoring system includes: at least one computing device configured to monitor a compressor during a load change by performing actions comprising: extracting a dynamic component of a blade time-of-arrival (TOA) deviation signal in response to the load change on the compressor; calculating, using the dynamic component, at least one of: a natural frequency of the GT compressor blade during the load change, an overshoot of the GT compressor blade during the load change, a rise time of the compressor blade during the load change, a damping factor of the compressor blade during the load change, or a settling time of the GT compressor blade after the load change; and determining whether the GT compressor blade is damaged based upon the at least one of: the natural frequency, the overshoot, the rise time, the damping factor, or the settling time.

13 Claims, 2 Drawing Sheets

(56) References Cited

U.S. PATENT DOCUMENTS

| | | | |
|---|---|---|---|
| 2011/0293403 A1* | 12/2011 | Badami | 415/118 |
| 2011/0320137 A1* | 12/2011 | Rajagopalan et al. | 702/34 |
| 2011/0320138 A1* | 12/2011 | Rajagopalan et al. | 702/34 |
| 2012/0035861 A1 | 2/2012 | Hadley et al. | |
| 2012/0051927 A1* | 3/2012 | LaMaster et al. | 416/223 A |
| 2012/0121425 A1* | 5/2012 | Suciu et al. | 416/193 R |
| 2013/0082833 A1* | 4/2013 | Bhattacharya et al. | 340/517 |
| 2013/0336780 A1* | 12/2013 | McKeever et al. | 415/208.1 |

* cited by examiner

BLADE MONITORING SYSTEM

BACKGROUND OF THE INVENTION

The subject matter disclosed herein relates to a blade monitoring system. Specifically, the subject matter disclosed herein relates to a system for monitoring the health of compressor blades.

Compressors, such as gas turbine compressors, receive inlet air from an air source and compress that air so that it may be later combined with fuel in a combustion chamber. The gas created from combustion of the compressed air and fuel mixture is then used to force rotation of blades within the gas turbine, and correspondingly, perform mechanical work on a shaft coupled to those blades. Over time, portions of the gas turbine compressor may become damaged. Gas turbine compressor blades may become damaged, for example, by particles, foreign objects, and/or corrosive elements in the inlet air, as well as excessive high cycle and low-cycle fatigue during compressor operation. Damage to gas turbine compressor blades may cause inefficiencies in gas turbine operation and/or unwanted vibrations in the compressor. In some cases, compressor blade damage may cause liberation of one or more blades, resulting in catastrophic damage to the compressor.

BRIEF DESCRIPTION OF THE INVENTION

A system for monitoring a compressor is disclosed. In one embodiment, the system includes: a sensor system for sensing a blade passing signal (BPS) of a passing compressor blade; and a blade monitoring system connected to the sensor system, the blade monitoring system performing actions comprising: obtaining the BPS and extracting a time-of-arrival (TOA) signal from the BPS indicating a time-of-arrival (TOA) of the compressor blade; calculating a time-of-arrival (TOA) deviation signal by comparing the TOA signal with an expected time-of-arrival (TOA) signal for the compressor blade; extracting a dynamic component of the TOA deviation signal in response to a load change on the compressor; calculating, using the dynamic component, at least one of: a natural frequency of the compressor blade during the load change, an overshoot for the compressor blade during the load change, a rise time of the compressor blade during the load change, a damping factor of the compressor blade during the load change, or a settling time of the compressor blade after the load change; and determining whether the compressor blade is damaged based upon the at least one of: the natural frequency, the overshoot, the rise time, the damping factor, or the settling time.

A first aspect of the invention includes a system for monitoring a compressor is disclosed. In one embodiment, the system includes: a sensor system for sensing a blade passing signal (BPS) of a passing compressor blade; and a blade monitoring system connected to the sensor system, the blade monitoring system performing actions comprising: obtaining the BPS and extracting a time-of-arrival (TOA) signal from the BPS indicating a time-of-arrival (TOA) of the compressor blade; calculating a time-of-arrival (TOA) deviation signal by comparing the TOA signal with an expected time-of-arrival (TOA) signal for the compressor blade; extracting a dynamic component of the TOA deviation signal in response to a load change on the compressor; calculating, using the dynamic component, at least one of: a natural frequency of the compressor blade during the load change, an overshoot for the compressor blade during the load change, a rise time of the compressor blade during the load change, a damping factor of the compressor blade during the load change, or a settling time of the compressor blade after the load change; and determining whether the compressor blade is damaged based upon the at least one of: the natural frequency, the overshoot, the rise time, the damping factor, or the settling time.

A second aspect of the invention includes a computer program comprising program code embodied in at least one computer-readable storage medium, which when executed, enables a computer system to implement a method of monitoring a compressor during a load change, the method comprising: extracting a dynamic component of a blade time-of-arrival (TOA) deviation signal in response to the load change on the compressor, the blade TOA deviation signal indicating a deviation in a time of arrival of a compressor blade; calculating, using the dynamic component, at least one of: a natural frequency of the compressor blade during the load change, an overshoot of the compressor blade during the load change, a rise time of the compressor blade during the load change, a damping factor of the compressor blade during the load change, or a settling time of the compressor blade after the load change; and determining whether the compressor blade is damaged based upon the at least one of: the natural frequency, the overshoot, the rise time, the damping factor, or the settling time A third aspect of the invention includes a system comprising: a gas turbine including a compressor having a plurality of blades; and at least one computing device configured to monitor the compressor during a load change by performing actions comprising: obtaining a time-of-arrival (TOA) deviation signal indicating a deviation in a time-of-arrival (TOA) of one of the plurality of blades; extracting a dynamic component of the TOA deviation signal in response to the load change on the compressor; calculating, using the dynamic component, at least one of: a natural frequency of the compressor blade during the load change, an overshoot of the compressor blade during the load change, a rise time of the compressor blade during the load change, a damping factor of the compressor blade during the load change, or a settling time of the compressor blade after the load change; and determining whether the compressor blade is damaged based upon the at least one of: the natural frequency, the overshoot, the rise time, the damping factor, or the settling time.

A fourth aspect of the invention includes a computer program comprising program code embodied in at least one computer-readable storage medium, which when executed, enables a computer system to implement a method of monitoring a compressor during a load change, the method comprising: extracting a dynamic component of a blade time-of-arrival (TOA) deviation signal in response to the load change on the compressor, the blade TOA deviation signal indicating a deviation in a time of arrival of a compressor blade; calculating, using the dynamic component, at least one of: a natural frequency of the compressor blade during the load change, an overshoot of the compressor blade during the load change, a rise time of the compressor blade during the load change, a damping factor of the compressor blade during the load change, or a settling time of the compressor blade after the load change; and determining whether the compressor blade is damaged based upon the at least one of: the natural frequency, the overshoot, the rise time, the damping factor, or the settling time.

A fifth aspect of the invention includes a computer-implemented method for monitoring a compressor during a load change, the method comprising: extracting a dynamic component of a blade time-of-arrival (TOA) deviation signal in response to the load change on the compressor, the blade TOA deviation signal indicating a deviation in a time of arrival of a compressor blade; calculating, using the dynamic component, at least one of: a natural frequency of the compressor blade during the load change, an overshoot of the compressor blade during the load change, a rise time of the compressor blade during the load change, a damping factor of the compressor blade during the load change, or a settling time of the compressor blade during the load change; and determining whether the compressor blade is damaged based upon the at least one of: natural frequency, rise time, damping factor, the overshoot, and the settling time.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Figure 1:
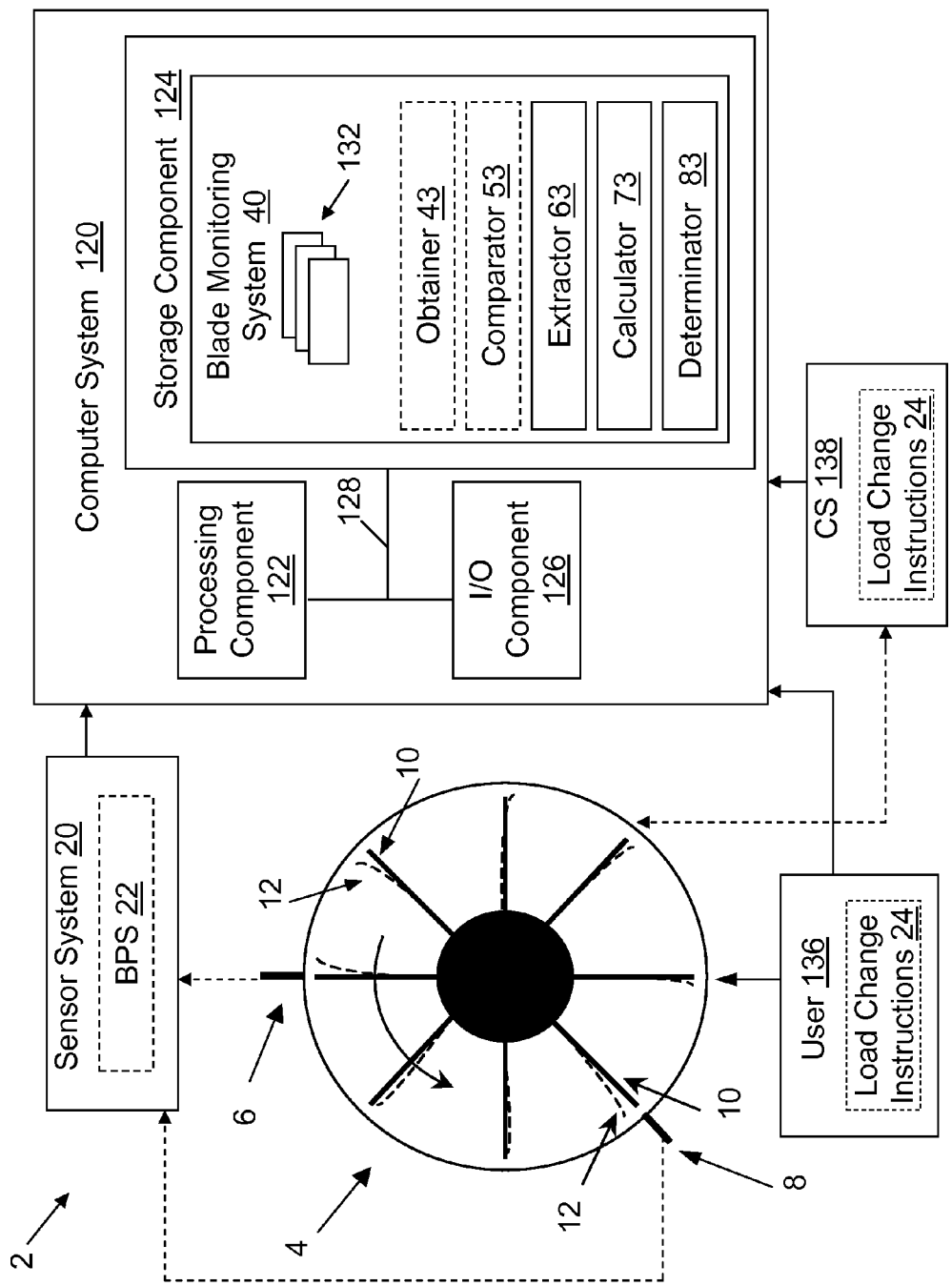
FIG. 1 shows a block diagram of an illustrative gas turbine monitoring system and a schematic depiction of a portion of a gas turbine.

Aspects of the invention provide for a blade monitoring system. More specifically, aspects of the invention provide for monitoring of the health of compressor blades (e.g., gas turbine compressor blades) during a change in the compressor's load conditions. This system may work in conjunction with, e.g., gas turbine compressors having variable (movable) inlet guide vanes (IGVs).

Compressors, e.g., gas turbine compressors, operate by taking air from an air source (e.g., ambient air) and compressing that air before it is combined with a fuel source in a combustion chamber. Gas turbine compressors are designed to run at an operational speed, which is predetermined based upon the application of the gas turbine (e.g., power generation applications, jet engine applications, etc.), the size/output of the gas turbine, and inlet conditions (e.g., pressure and temperature of inlet air). Aside from start-up, shut-down, and "speed sweep" conditions, a power generation gas turbine compressor will run at a relatively constant operational speed. Prior attempts to detect damage to gas turbine compressor blades in power generation applications have relied upon changes in the compressor's speed (e.g., change in the rotational speed of one or more blades) to detect a change in the natural frequencies in those blades. These approaches are limited by the fact that a base-loaded gas turbine runs at a relatively constant operational speed over long periods of time, with few operational speed changes (e.g., startups and shutdowns). That is, data gathered during speed changes in the gas turbine compressor are limited to only a few conditions, e.g., start-up, shut-down, or "speed sweep." As is known in the art, the gas turbine compressor's speed is increased during start up, and is decreased during shut down. "Speed sweeps" are be performed occasionally on a gas turbine by taking the unit "off-line" (disconnecting from the power grid which it is supplying), and intentionally varying the speed of the gas turbine compressor to check parameters such as overspeed protection safeguards. These approaches using speed changes are not applicable when the gas turbine compressor is operating at a constant speed (e.g., running speed).

Aspects of the invention use changes in the gas turbine compressor load, instead of speed changes, to determine whether a compressor blade is damaged. Gas turbine compressor load may be measured, for example, by determining the pressure drop from the inlet of the compressor to the outlet of the compressor. As power demands (load) of a gas turbine system vary, so does the amount of compressed air required from a gas turbine compressor. In order to modify the amount of compressed air provided by the compressor, the position of inlet guide vanes (IGVs) are manipulated to introduce more or less air into the compressor. Manipulating the position of the IGVs allows for a different volume of gas to enter the compressor, thereby affecting the compressor's output. Where the volume of air entering the compressor is varied (e.g., during a load change), the gas turbine compressor blades experience changing pressure forces causing vibrations in those blades. Aspects of the invention allow for determining whether one or more gas turbine compressor blades are damaged based upon data gathered during compressor load changes. This approach may take advantage of the frequent and normal turndown operations of power generating gas turbines. The monitoring system can be configured to run every time there is a significant load change, thereby allowing frequent measurement, and long term trending of changes in blade health over the operational life of the turbine.

Turning to FIG. 1, an illustrative schematic environment 2 including a compressor (e.g., a gas turbine compressor) 4 and a blade monitoring system 40 are shown according to an embodiment. Compressor 4 is shown including a plurality of compressor blades (or simply, blades) 10 in motion during operation of compressor 4 (operation illustrated by counter-clockwise arrow). The nominal position of each blade is indicated by the numeral 10, while each blade's actual position during operation of compressor 4 is indicated by the numeral 12 (or, "deflection position"). The nominal position 10 is predefined based upon the geometry of compressor (e.g., gas turbine compressor) 4 and its rate of speed during operation. The actual position 12 is measured, e.g., by one or more sensors, as is described further herein. As used herein, blades will be referenced by the numeral 10. Further shown in FIG. 1 is a sensor system 20, operatively connected to compressor 4 by conventional (e.g., wireless or hard-wired) means. Sensor system 20 may be linked to (e.g., via wireless or hard-wired means), or include, a first sensor 6 and/or a second sensor 8. First sensor 6 and second sensor 8 may aid in determining an actual (or, deflection) position 12 of a compressor blade 10 during operation of compressor 4. It is understood that first sensor 6 and second sensor 8 are merely illustrative of one configuration of sensor(s) capable of working in conjunction with embodiments of the invention. For example, in one embodiment, only a single sensor (e.g., sensor 6 or sensor 8) may be used to determine and actual (deflection) position 12 of compressor blade 10 during operation of compressor 4.

Figure 2:
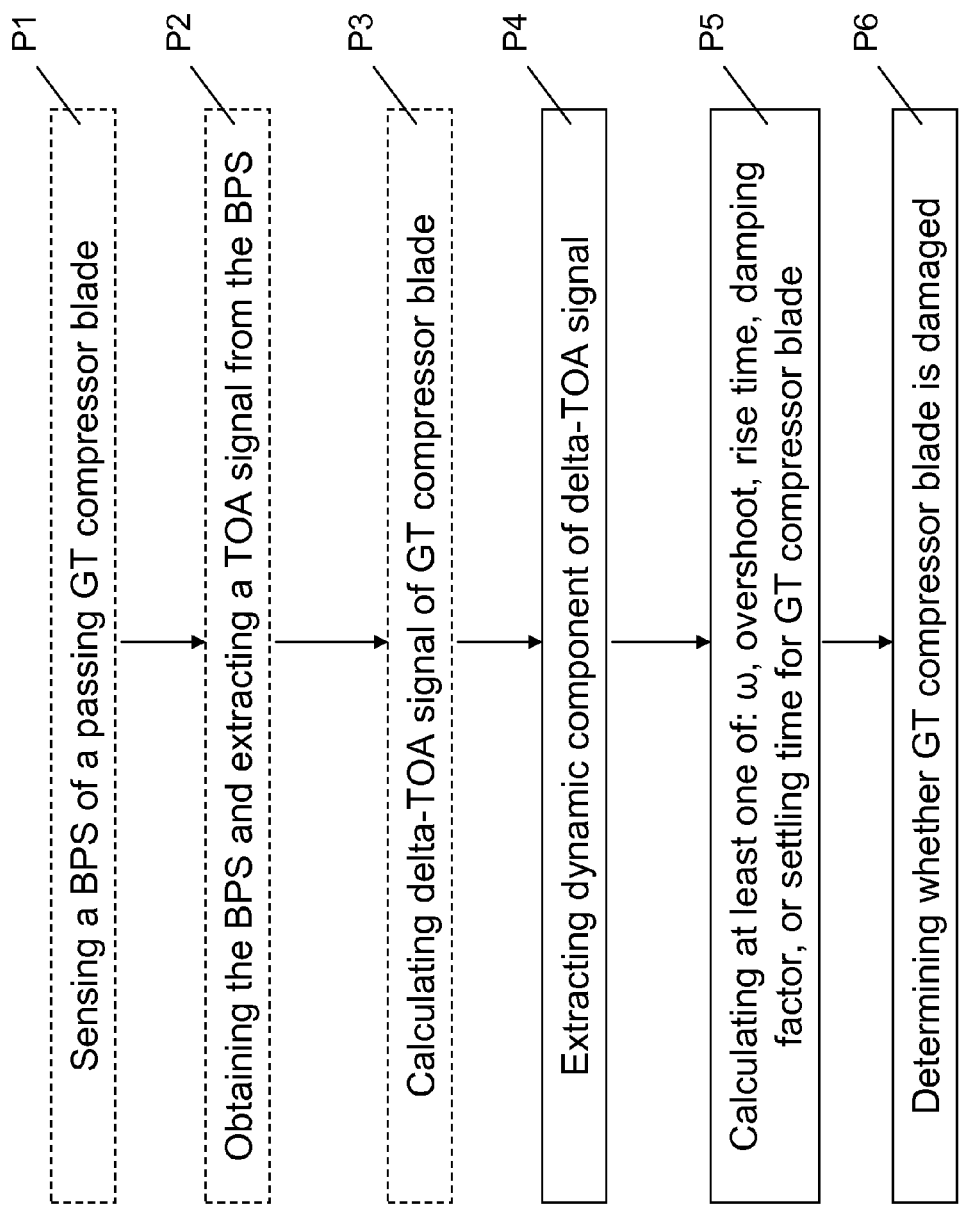
FIG. 2 shows a process flow diagram of a method according to an embodiment of the invention.

With continuing reference to FIG. 1, and with further reference to the process flow diagram of FIG. 2, operation of blade monitoring system 40 within environment 2 is further described. While the blades 10 rotate within compressor 4, sensor system 20 senses a blade passing signal (BPS) 22 for each blade 10 as it passes under a sensor. For example, one or more sensors (e.g., first sensor 6 and/or second sensor 8) may be configured to sense the passing of a blade using one or more of a laser probe, a magnetic sensor, a capacitive sensor, a microwave sensor, or an eddy current sensor. However, sensors may be configured to sense BPS 22 via any techniques known in the art. In any case, sensor system 20 may be linked to or include one or more sensors (e.g., first sensor 6 and/or second sensor 8) which may sense a BPS 22 for a passing blade 10.

After obtaining BPS 22, sensor system 20 may transmit BPS 22 to a computer system 120 (e.g., via wireless or hardwired means), store it in an external memory (not shown), or transmit it to an intermediate system where it is capable of being obtained by a blade monitoring system (e.g., blade monitoring system 40). Computer system 120 can perform processes described herein to determine whether one or more blades 10 are damaged. As shown in FIG. 1, computer system 120 may include blade monitoring system 40, which makes computer system 120 operable to determine whether one or more blades 10 of compressor 4 are damaged.

Computer system 120 is shown in communication with sensor system 20, which may store BPS 22 and/or transmit BPS 22 to computer system 120. Further, computer system 120 is shown in communication with a user 136. A user 136 may be, for example, a programmer or operator. Additionally, computer system 120 is shown in communication with a control system (CS) 138. CS 138 may be, for example, a computerized control system for controlling operation of gas turbine compressor 4. Interactions between these components and computer system 120 will be discussed elsewhere in this application. Computer system 120 is shown including a processing component 122 (e.g., one or more processors), a storage component 124 (e.g., a storage hierarchy), an input/output (I/O) component 126 (e.g., one or more I/O interfaces and/or devices), and a communications pathway 128. In one embodiment, processing component 122 executes program code, such as blade monitoring system 40, which is at least partially embodied in storage component 124. While executing program code, processing component 122 can process data, which can result in reading and/or writing the data to/from storage component 124 and/or I/O component 126 for further processing. Pathway 128 provides a communications link between each of the components in computer system 120. I/O component 126 can comprise one or more human I/O devices or storage devices, which enable user 136 and/or CS 138 to interact with computer system 120 and/or one or more communications devices to enable user 136 and/or CS 138 to communicate with computer system 120 using any type of communications link. To this extent, blade monitoring system 40 can manage a set of interfaces (e.g., graphical user interface(s), application program interface, and/or the like) that enable human and/or system interaction with blade monitoring system 40.

In any event, computer system 120 can comprise one or more general purpose computing articles of manufacture (e.g., computing devices) capable of executing program code installed thereon. As used herein, it is understood that "program code" means any collection of instructions, in any language, code or notation, that cause a computing device having an information processing capability to perform a particular function either directly or after any combination of the following: (a) conversion to another language, code or notation; (b) reproduction in a different material form; and/or (c) decompression. To this extent, blade monitoring system 40 can be embodied as any combination of system software and/or application software. In any event, the technical effect of computer system 120 is to determine whether one or more blade(s) 10 is damaged.

Further, blade monitoring system 40 can be implemented using a set of modules 132. In this case, a module 132 can enable computer system 20 to perform a set of tasks used by blade monitoring system 40, and can be separately developed and/or implemented apart from other portions of blade monitoring system 40. Blade monitoring system 40 may include modules 132 which comprise a specific use machine/hardware and/or software. Regardless, it is understood that two or more modules, and/or systems may share some/all of their respective hardware and/or software. Further, it is understood that some of the functionality discussed herein may not be implemented or additional functionality may be included as part of computer system 120.

When computer system 120 comprises multiple computing devices, each computing device may have only a portion of blade monitoring system 40 embodied thereon (e.g., one or more modules 132). However, it is understood that computer system 120 and blade monitoring system 40 are only representative of various possible equivalent computer systems that may perform a process described herein. To this extent, in other embodiments, the functionality provided by computer system 120 and blade monitoring system 40 can be at least partially implemented by one or more computing devices that include any combination of general and/or specific purpose hardware with or without program code. In each embodiment, the hardware and program code, if included, can be created using standard engineering and programming techniques, respectively.

Regardless, when computer system 120 includes multiple computing devices, the computing devices can communicate over any type of communications link. Further, while performing a process described herein, computer system 120 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

As discussed herein, blade monitoring system 40 enables computer system 120 to determine whether one or more blades 10 is damaged. Blade monitoring system 40 may include logic, which may include the following functions: an obtainer 43 (shown in phantom as optionally included in blade monitoring system 40), a comparator 53 (shown in phantom as optionally included in blade monitoring system 40), an extractor 63, a calculator 73 and a determinator 83. In one embodiment, blade monitoring system 40 may include logic to perform the above-stated functions. Structurally, the logic may take any of a variety of forms such as a field programmable gate array (FPGA), a microprocessor, a digital signal processor, an application specific integrated circuit (ASIC) or any other specific use machine structure capable of carrying out the functions described herein. Logic may take any of a variety of forms, such as software and/or hardware. However, for illustrative purposes, blade monitoring system 40 and logic included therein will be described herein as a specific use machine. As will be understood from the description, while logic is illustrated as including each of the above-stated functions, not all of the functions are necessary according to the teachings of the invention as recited in the appended claims.

With continuing reference to FIGS. 1-2, during operation, sensor system 20 and blade monitoring 40 may work together to monitor one or more blades 10 and determine whether the one or more blades 10 is damaged. In one embodiment, sensor system 20 may provide BPS 22 to blade monitoring system 40 where it may be obtained by obtainer 43 (optional process Pl, FIG. 2). In another embodiment, as described herein, obtainer 43 may obtain BPS 22 from a source other than sensor system

20 (e.g., via a storage system or intermediate system/device). In any case, obtainer 43 may obtain BPS 22 and extract a time-of-arrival (TOA) signal from BPS 22 (FIG. 2, optional process P2). The TOA signal may indicate a time of arrival of compressor blade 10. For example, the time of arrival of a compressor blade may be measured by timing how long it takes a blade 10 to pass under a sensor (e.g., first sensor 6 or second sensor 8) with reference to a once/revolution (1/rev) marker, as is known in the art. In another example, the time of arrival of a blade 10 may be measured by timing how long it takes that blade 10 to travel from a first sensor (e.g., first sensor 6) to a second sensor (e.g., second sensor 8). The TOA signal may be extracted by obtainer 43 via, for example, an edge threshold approach, a centroid approach, or other conventional signal processing approaches. In any case, obtainer 43 obtains BPS 22 and extracts the TOA signal (FIG. 2, process P2). Comparator 53 may then compare the TOA signal extracted from BPS 22 with an expected time-of-arrival (TOA) signal for the blade 10 (FIG. 2, process P3). The expected TOA signal may be predetermined based upon which sensor(s) (e.g., first sensor 6 and/or second sensor 8) are detecting BPS 22. That is, an expected TOA signal can be calculated based upon the speed at which gas turbine compressor 4 is operating, the distance between blades 10, and the location of one or more sensors (e.g., sensors 6, 8). In any case, comparator 53 may calculate a time-of-arrival (TOA) deviation signal by comparing the TOA signal with the expected TOA signal for a particular blade 10 (FIG. 2, process P3).

As indicated in FIG. 1, obtainer 43 and comparator 53 may be optional components (or, modules) in blade monitoring system 40. That is, obtainer 43 and comparator 53 may be part of an external system (e.g., sensor system 20 and/or control system 138) which may perform the functions described herein. In one embodiment, control system 138 and/or sensor system 20 may be configured to monitor e.g., gas turbine operating parameters (e.g., operating conditions of gas turbine compressor 4 or other components in a gas turbine system). In one embodiment, blade monitoring system 40 can access load information and IGV position/angle information from a turbine control system (e.g., control system 138) whenever the load change occurs.

In one embodiment, obtainer 43 and comparator 53 may operate continuously as described herein (as either part of blade monitoring system 40 or an external system), where extractor 63 extracts the dynamic component of the TOA deviation signal in response to a load change (e.g., a gas turbine load change) or a change in the position of one or more inlet guide vanes (IGVs) on the gas turbine compressor 4 (FIG. 2, process P4). Specifically, extractor 63 may extract the dynamic component of the TOA deviation signal in response to detecting, or receiving load change information (e.g., load change instructions 24) or information indicating a change in IGV angle(s). Load change instructions 24 may include, for example, instructions to change the position of one or more inlet guide vanes (IGVs). As is known in the art, a compressor's (e.g., gas turbine compressor) load may be adjusted based upon a desired power output. For example, where a gas turbine is used in power generation and an increased power output is required, an operator or computer system may increase the volume of intake air to a compressor (e.g., compressor 4) to provide for greater output in the combustion cycle. In order to modify the amount of compressed air provided by the compressor, the position of one or more IGVs is manipulated to introduce more or less air into the compressor. Manipulating the position of the IGVs allows for a different volume of gas to enter the compressor, thereby affecting the compressor's output. Where the volume of air entering the compressor is varied (e.g., during a load change), the gas turbine compressor blades may experience pressure forces causing vibrations in the blades. These vibrations may be detectable via the extracted dynamic component of the TOA deviation signal.

During a load change on compressor 4 (e.g., a gas turbine compressor), blades 10 may exhibit ringing or vibration, as is typically seen in the response of underdamped systems to an input disturbance. The TOA deviation signal of one or more blade(s) 10 during a load change on compressor 4 will exhibit a measurable change in magnitude (representing oscillation of the blade(s) 10 during the load change). In some embodiments, the exact magnitude of the forcing function is not known in general, and in this case, the oscillation of blade(s) (e.g., blade(s) 10) may be normalized for a standard load/IGV angle shift. These normalized features of the blades (e.g., blades 10), such as rise time, natural frequency, damping factor and settling time may be estimated, using known system identification techniques. The normalized features may then be compared with features taken from the dynamic component of the TOA deviation signal, as described further herein.

Returning to FIG. 2, after extracting the dynamic component of the TOA deviation signal, calculator 73 may calculate at least one of: a natural frequency ($\omega$) of blade 10 during the load change, an overshoot of blade 10 during the load change, a rise time of blade 10 during the load change, a damping factor of blade 10 during the load change, or a settling time of blade 10 during the load change (process P5). As used herein, the natural frequency of blade 10 may be equal to the frequency at which the blade 10 freely vibrates during the load change; the overshoot of the blade 10 may be equal to the amount the dynamic component of the TOA deviation signal exceeds its steady-state value; the rise time of blade 10 may be equal to the time elapsed during a change in magnitude of the TOA deviation signal for that blade 10; the damping factor (or, damping ratio) of blade 10 represents how quickly a blade's oscillations are eliminated; and the settling time is the time required, after the initiation of the load change, for blade 10 to enter its approximately steady state position. These characteristics may be calculated using any conventional techniques known in the art (e.g., graphical and/or signal analysis calculations).

Once calculated, determinator 83 may compare one or more of the natural frequency, the overshoot, the rise time, the damping factor, or the settling time for a blade 10 during the load change to expected values for these characteristics. The expected values for all these parameters (e.g., natural frequency, overshoot, etc.) may be calculated and stored beforehand, when the blades are in a known healthy, or undamaged state. The deviations between a healthy and damaged blade may depend on the geometry of the blade, and the type, location and magnitude of the damage. Computer models may be used to generate the expected responses (e.g., expected parameter values such as natural frequency, overshoot, etc.) of one or more blades to a change in load conditions, and these expected responses are then used at run-time by the blade monitoring system 40 (e.g., determinator 83) to determine whether a fault exists (process P6, FIG. 2). The expected parameter values may be specific to gas turbine compressor 4, and may be stored (e.g., in storage component 124), or provided to blade monitoring system 40 by a user (e.g., user 136), or other external system.

While shown and described herein as an environment 2 including blade monitoring system 40, it is understood that aspects of the invention further provide various alternative embodiments. For example, in one embodiment, the invention provides a computer program embodied in at least one computer-readable storage medium, which when executed, enables a computer system (e.g., computer system 120) to determine whether one or more blades 10, 12 is damaged. To this extent, the computer-readable storage medium includes program code, such as blade monitoring system 40 (FIG. 1), which implements some or all of a process described herein. It is understood that the term "computer-readable storage medium" comprises one or more of any type of tangible medium of expression capable of embodying a copy of the program code (e.g., a physical embodiment). For example, the computer-readable storage medium can comprise: one or more portable storage articles of manufacture; one or more memory/storage components of a computing device; paper; and/or the like. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

In another embodiment, the invention provides a method of providing a copy of program code, such as blade monitoring system 40 (FIG. 1), which implements some or all of a process described herein. In this case, a computer system can generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of program code that implements some or all of a process described herein, which includes a computer system receiving the set of data signals described herein, and translating the set of data signals into a copy of the computer program embodied in at least one computer-readable medium. In either case, the set of data signals can be transmitted/received using any type of communications link.

In still another embodiment, the invention provides a method of generating a system for determining whether one or more blades 10, 12 is damaged. In this case, a computer system, such as computer system 120 (FIG. 1), can be obtained (e.g., created, maintained, made available, etc.) and one or more modules for performing a process described herein can be obtained (e.g., created, purchased, used, modified, etc.) and deployed to the computer system. To this extent, the deployment can comprise one or more of: (1) installing program code on a computing device from a computer-readable medium; (2) adding one or more computing and/or I/O devices to the computer system; and (3) incorporating and/or modifying the computer system to enable it to perform a process described herein.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system for monitoring a compressor, the system comprising:
    a sensor system for sensing a blade passing signal (BPS) of a passing compressor blade; and
    a blade monitoring system connected to the sensor system, the blade monitoring system performing actions comprising:
        obtaining the BPS and extracting a time-of-arrival (TOA) signal from the BPS indicating a time-of-arrival (TOA) of the compressor blade;
        calculating a time-of-arrival (TOA) deviation signal by comparing the TOA signal with an expected time-of-arrival (TOA) signal for the compressor blade;
        detecting load change instructions instructing a change in position of at least one inlet guide vane on the compressor;
        extracting, in response to a load change on the compressor, a dynamic component of the TOA deviation signal, wherein the load change on the compressor is indicated by the load change instructions instructing the change in the position of the at least one inlet guide vane on the compressor, wherein the extracting is triggered by the detecting of the load change instructions;
        calculating, using the dynamic component, at least one of: a natural frequency of the compressor blade during the load change, an overshoot for the compressor blade during the load change, a rise time of the compressor blade during the load change, a damping factor of the compressor blade during the load change, or a settling time of the compressor blade after the load change;
        determining whether the compressor blade is damaged based upon the at least one of: the natural frequency, the overshoot, the rise time, the damping factor, or the settling time; and
        determining that the load change is occurring and sends instructions to extract the dynamic component of the TOA deviation signal.

2. The system of claim 1, wherein the compressor is a component in a gas turbine.

3. The system of claim 1, wherein the sensor system senses the blade passing signal using at least one of optical sensing, capacitive sensing, microwave sensing or eddy current sensing.

4. The system of claim 1, wherein the TOA signal is extracted from the BPS using one of an edge threshold extraction or a centroid extraction.

5. A system comprising:
a gas turbine including a compressor having a plurality of blades; and
at least one computing device configured to monitor the compressor during a load change by performing actions comprising:
- obtaining a time-of-arrival (TOA) deviation signal indicating a deviation in a time-of-arrival (TOA) of one of the plurality of blades;
- detecting load change instructions instructing a change in position of at least one inlet guide vane on the compressor;
- extracting, in response to the load change on the compressor, a dynamic component of the TOA deviation signal, wherein the load change on the compressor is indicated by the load change instructions instructing the change in the position of the at least one inlet guide vane on the compressor, wherein the extracting is triggered by the detecting of the load change instructions;
- calculating, using the dynamic component, at least one of:
  - a natural frequency of the compressor blade during the load change, an overshoot of the compressor blade during the load change, a rise time of the compressor blade during the load change, a damping factor of the compressor blade during the load change, or a settling time of the compressor blade after the load change; and
- determining whether the compressor blade is damaged based upon the at least one of: the natural frequency, the overshoot, the rise time, the damping factor, or the settling time.

6. The system of claim 5, further comprising a sensor system for obtaining an actual time-of-arrival (TOA) signal of the blade.

7. The system of claim 6, wherein the at least one computing device is further configured, in response to the load change, to initiate the sensor system to obtain the actual TOA signal.

8. The system of claim 5, wherein the at least one computing device is further configured to determine occurrence of the load change and in response thereto, send instructions to extract the dynamic component of the TOA deviation signal.

9. The system of claim 5, wherein the at least one computing device is further configured to obtain the TOA deviation signal by comparing an actual time-of-arrival (TOA) signal of the blade with an expected time-of-arrival (TOA) signal of the blade.

10. A computer program comprising program code embodied in at least one non-transitory computer-readable medium, which when executed, enables a computer system to implement a method of monitoring a compressor during a load change, the method comprising:
- detecting load change instructions instructing a change in position of at least one inlet guide vane on the compressor;
- extracting a dynamic component of a blade time-of-arrival (TOA) deviation signal in response to the load change on the compressor, the blade TOA deviation signal indicating a deviation in a time of arrival of a compressor blade, wherein the load change on the compressor is indicated by the load change instructions instructing the change in the position of the at least one inlet guide vane on the compressor, wherein the extracting is triggered by the detecting of the load change instructions;
- calculating, using the dynamic component, at least one of:
  - a natural frequency of the compressor blade during the load change, an overshoot of the compressor blade during the load change, a rise time of the compressor blade during the load change, a damping factor of the compressor blade during the load change, or a settling time of the compressor blade after the load change; and
- determining whether the compressor blade is damaged based upon the at least one of: the natural frequency, the overshoot, the rise time, the damping factor, or the settling time.

11. The computer program of claim 10, the method further comprising obtaining an actual time-of-arrival (TOA) signal of the compressor blade.

12. The computer program of claim 11, the method further comprising initiating the measuring of the actual TOA signal in response to the load change.

13. The computer program of claim 10, the method further comprising obtaining the TOA deviation signal by comparing an actual time-of-arrival (TOA) signal of the compressor blade with an expected time-of-arrival (TOA) signal of the compressor blade.

* * * * *